United States Patent [19]

Woody et al.

[11] 4,345,772

[45] Aug. 24, 1982

[54] CONSTANT STRAIN BOOT SEAL

[75] Inventors: Albert L. Woody; Lawrence E. Fox, both of Peoria; Harold L. Reinsma, Dunlap, all of Ill.

[73] Assignee: Caterpillar Tractor Co., Peoria, Ill.

[21] Appl. No.: 273,892

[22] PCT Filed: Jan. 26, 1981

[86] PCT No.: PCT/US81/00118

§ 371 Date: Jan. 26, 1981

§ 102(e) Date: Jan. 26, 1981

[51] Int. Cl.³ .............................................. F16J 15/52
[52] U.S. Cl. .................................. 277/212 FB; 277/30; 403/50; 74/18.1; 464/173
[58] Field of Search ................... 277/30, 31, 33, 212 R, 277/212 C, 212 F, 212 FB; 403/50, 51; 64/32 F; 74/18, 18.1, 18.2

[56] References Cited

U.S. PATENT DOCUMENTS

| 2,188,106 | 1/1940 | Caldwell | 309/4 |
| 2,305,265 | 12/1942 | Le Tourneau | 277/212 FB |
| 2,881,015 | 4/1959 | Wahl | 286/11 |
| 3,210,107 | 10/1965 | Flumerfelt | 277/212 FB |
| 3,285,632 | 11/1966 | Dunkle | 285/363 |
| 3,317,215 | 5/1967 | Wolniak et al. | 277/188 |
| 3,381,987 | 5/1968 | Husen | 403/51 |
| 3,403,932 | 10/1968 | Kutcher | 287/87 |
| 3,611,816 | 10/1971 | Wedekind et al. | 64/32 F |
| 3,868,145 | 2/1975 | Cobb et al. | 299/37 |
| 3,922,017 | 11/1975 | Cobb | 299/70 |
| 4,003,666 | 1/1977 | Gaines et al. | 403/36 |
| 4,003,667 | 1/1977 | Gaines et al. | 403/36 |
| 4,021,049 | 5/1977 | Phelps et al. | 277/11 |
| 4,121,845 | 10/1978 | Reynolds et al. | 277/212 |

FOREIGN PATENT DOCUMENTS

| 1047284 | 7/1953 | France | 64/32 F |
| 1150954 | 5/1969 | United Kingdom | 64/32 F |

Primary Examiner—Robert S. Ward, Jr.
Attorney, Agent, or Firm—J. W. Keen

[57] ABSTRACT

An elastomeric seal apparatus (16) having an inner annular terminating portion (36) which is attachable to a first (12) member, an outer annular terminating portion (38) which is attachable to a second (14) member, and an annular convoluted flexible portion (40) which is disposed between the inner (36) and outer (38) terminating portions and has an inner (46) and an outer (48) margin which are respectively joined thereto. The thickness of the convoluted flexible portion (40) decreases from the relatively thicker inner margin (46) to the relatively thinner outer margin (48) in proportion to a radial distance (H) extending from the inner margin (46) to the flexible portion (40). A concentrically inner convolution (42) and a concentrically outer convolution (44) constitute the flexible portion (40) and have a relatively small ($R_1$) and a relatively large ($R_2$) radius of curvature. When the inner (36) and outer (38) terminating portions are relatively reciprocated with the first (12) and second (14) members about a longitudinal seal axis (16a), the tapered, convoluted structure of seal apparatus (16) exhibits extended life as a result of substantially equalizing the maximum uniform strains induced therein.

8 Claims, 6 Drawing Figures

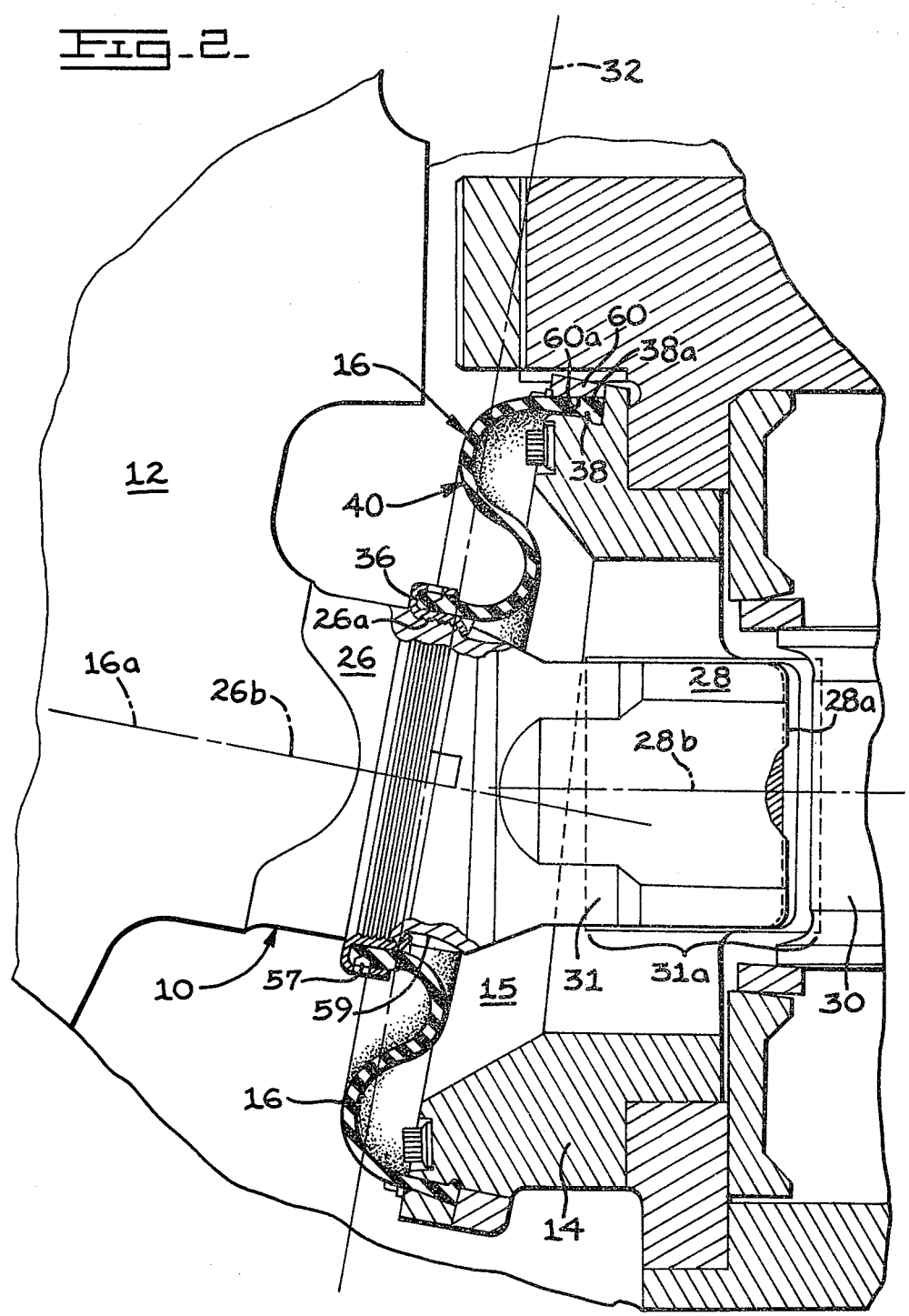

Fig. 3.A
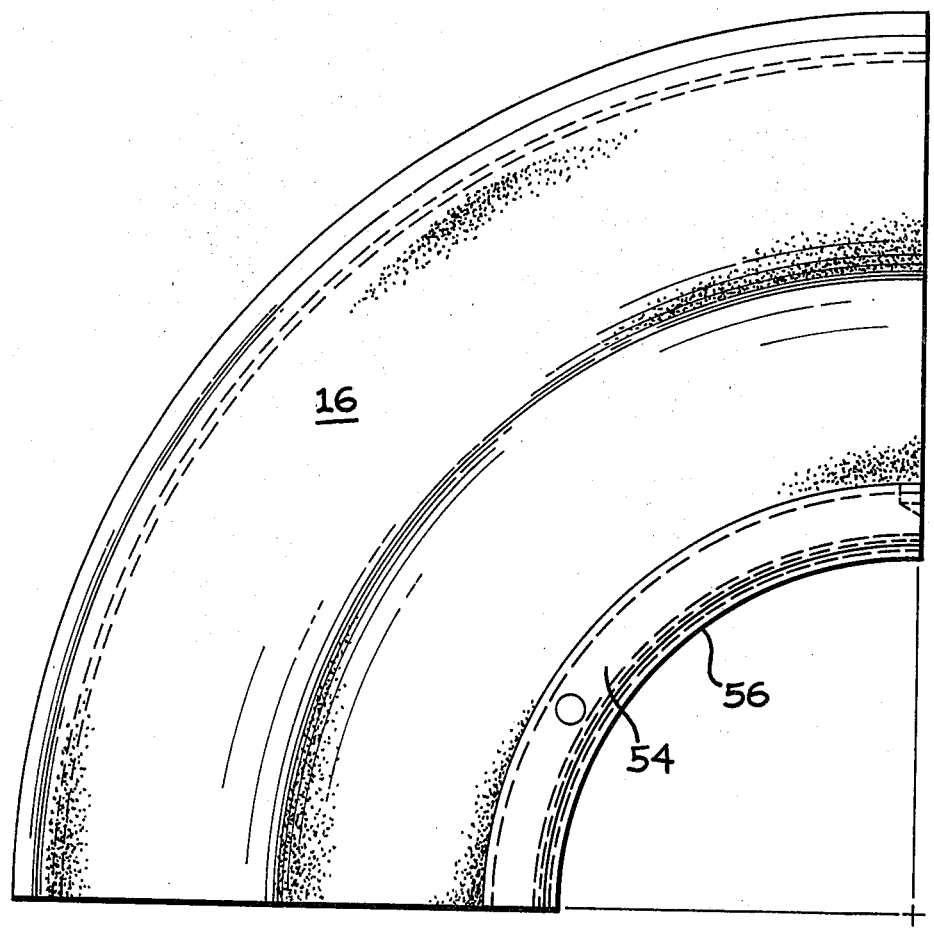

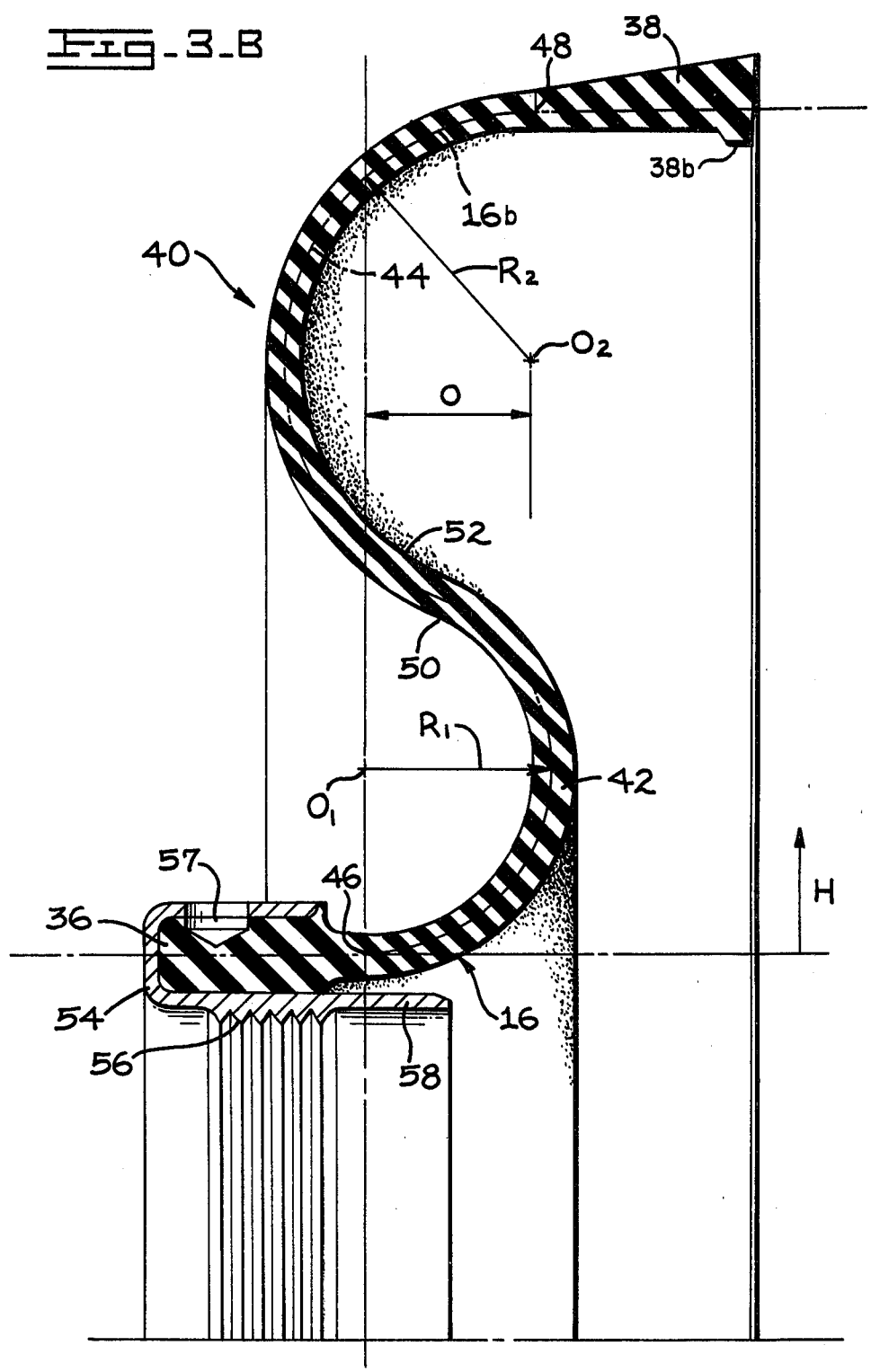

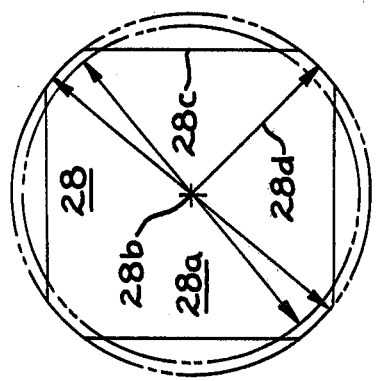
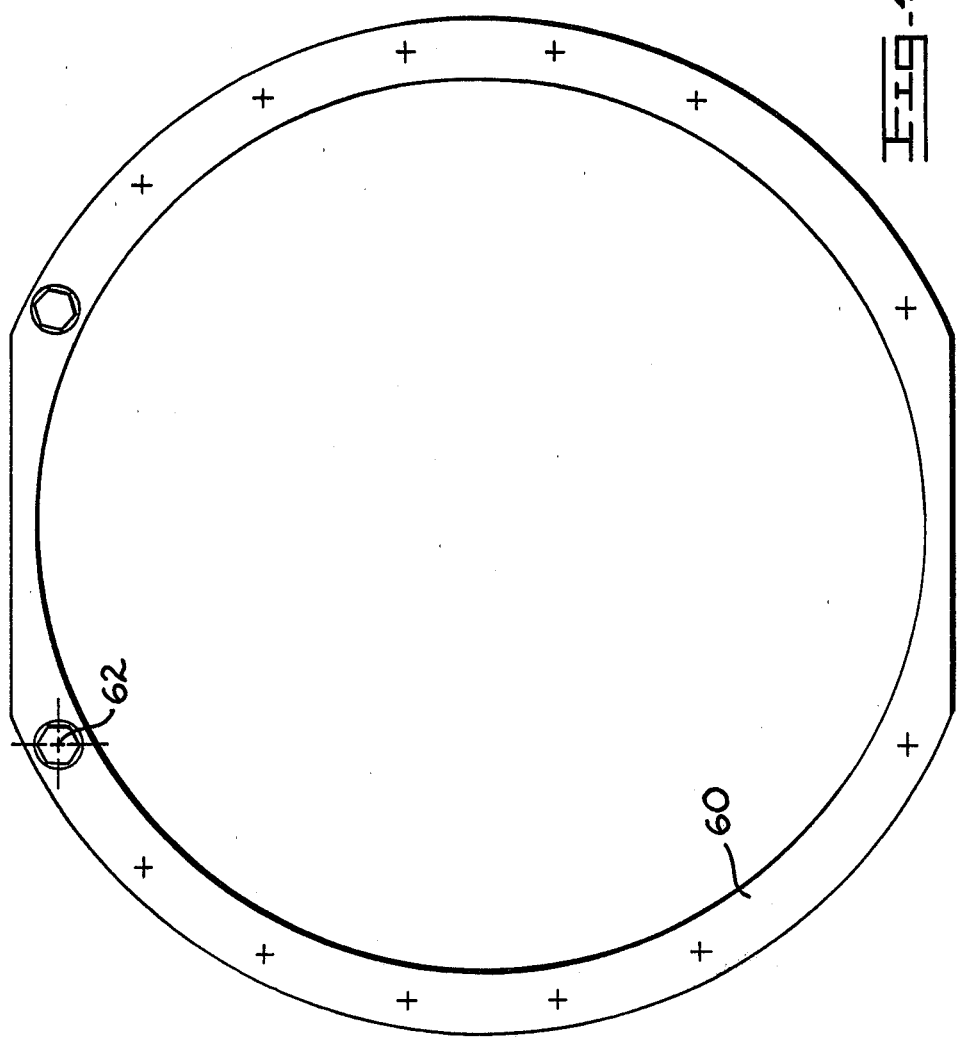

CONSTANT STRAIN BOOT SEAL

DESCRIPTION

1. Technical Field

This invention relates generally to impact apparatus for fracturing material and, more particularly, to a relatively reciprocatable shank/housing configuration which facilitates sealing therebetween.

2. Background Art

Numerous apparatus are available for fracturing rock formations and other materials in mining, excavation, and earthmoving in general. Fracturing materials by blasting with explosives can be an efficient technique, but may, under some circumstances, present an unacceptably high risk when used near population centers.

Mechanical impact apparatus such as jack hammers and/or crank driven impactors are known but are relatively slow and inefficient or constitute bulky devices which are not easily manipulated into limited access places.

U.S. Pat. No. 3,868,145 which issued Feb. 25, 1975, and U.S. Pat. No. 3,922,017 which issued Nov. 25, 1975, both being assigned to the present invention's assignee, illustrate two highly efficient, compact, manipulatable material fracturing devices. Each of the devices includes a fracturing shank which is reciprocatably mounted adjacent a power supply housing. The shank, during operation, reciprocates between a first impact receiving position and a second, material fracturing position where the fracturing shank is in penetrating contact with the fracturable material. In U.S. Pat. No. 3,868,145 the fracturing shank has an impact receiving portion which protrudes into the housing and is intermittently impacted by a rotatable eccentric to provide such reciprocating motion. In U.S. Pat. No. 3,922,017, an intermediate hammer member extends into the energy supply housing and is used to transfer energy generated and stored within that housing to an impact receiving portion of the shank which is external to the housing. Such intermediate hammer member extends into and is, likewise, reciprocably mounted relative to the housing.

In each of the aforementioned apparatus the reciprocatable member which extends into the energy supply housing must be sealed to the housing to retain lubricant within the housing and prevent foreign particle intrusion into the housing. Moreover, seal apparatus providing such sealing must be attached to the reciprocatable member (shank or intermediate hammer) to avoid transporting foreign debris into the housing on the surface of the reciprocatable member when it moves from its second to its first position. Sliding seals such as are commonly used in hydraulic cylinder applications and are illustrated in U.S. Pat. No. 4,121,845 which issued Oct. 24, 1978, U.S. Pat. No. 2,188,106 which issued Jan. 23, 1940, U.S. Pat. No. 2,881,015 which issued Apr. 7, 1959, U.S. Pat. No. 4,021,049 which issued May 3, 1977, U.S. Pat. No. 3,403,932 which issued Oct. 1, 1968, U.S. Pat. No. 3,285,632 which issued Nov. 15, 1966, U.S. Pat. No. 3,317,215 which issued May 2, 1967, U.S. Pat. No. 4,003,666 which issued Jan. 18, 1977, and U.S. Pat. No. 4,003,667 which issued Jan. 18, 1977, are, thus, not suitable for use in such material fracturing apparatus since they can permit transportation of such foreign debris into the housing.

A type of boot seal, illustrated in U.S. Pat. Nos. 3,868,145 and 3,922,017, is attached to both the housing and the reciprocatable member which extends into the housing. While the impacting apparatus described in the immediately herebefore U.S. Patents have, in general, fractured material in an efficient manner, the life of the boot seals has been erratic. A short boot seal life is highly undesirable since repair or replacement of such boot seal can be a time consuming process which must often be performed under field conditions. Moreover, during such repair, the impact fracturing apparatus utilizing the boot seal must be shut down.

DISCLOSURE OF THE INVENTION

In one aspect of the present invention a seal apparatus is provided for sealing between relatively reciprocatable members and includes an annular flexible portion having an inner margin, an outer margin, and a plurality of concentrically arranged, interconnected convolutions which have a thickness which is tapered from the inner margin to the outer margin.

BRIEF DESCRIPTION OF THE DRAWINGS

The invention will be more fully understood from the following detailed description of a preferred embodiment taken in connection with the accompanying drawings in which:

FIG. 2 is an enlarged view of a portion of FIG. 1;

FIG. 3a is a front elevational view of a portion of a seal used in the apparatus illustrated in FIGS. 1 and 2;

FIG. 3b is a transverse sectional view of the seal illustrated in FIG. 3a;

FIG. 4 is a front elevational view of a seal retaining ring used to secure the seal to a housing illustrated in FIGS. 1 and 2; and FIG. 5 is a rear elevational view of a portion of a shank illustrated in FIGS. 1 and 2.

BEST MODE FOR CARRYING OUT THE INVENTION

Figure 1:
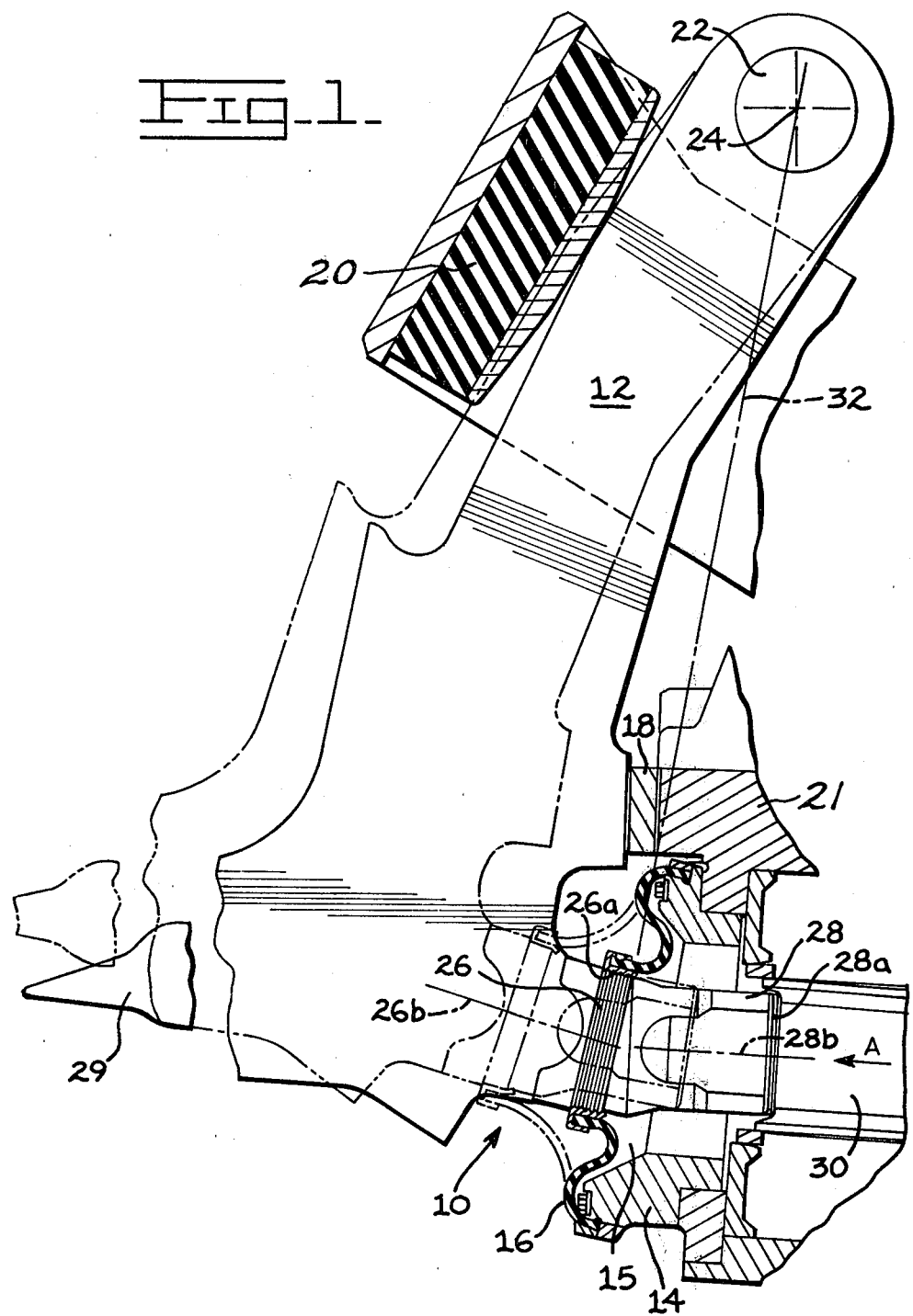
FIG. 1 is a partial transverse sectional view of a material fracturing apparatus in which the invention is incorporated.

Referring now to the drawings in detail, FIG. 1 illustrates an impact fracturing apparatus 10 having an arcuately reciprocatable shank member 12, a housing 14 having an interior 15 into which the shank 12 is arcuately reciprocatable, and an annular seal member 16 connected to the reciprocatable shank 12 and the housing 14 and having a longitudinal seal axis 16a. The shank 12 is reciprocatable between a first, extreme impact receiving position (illustrated in full) and a second, extreme material fracturing position (illustrated in phantom). Arcuate reciprocation of the shank 12 to the right (as viewed in FIG. 1) beyond its first, extreme impact receiving position is precluded by a stopping member 18 which abuts the shank 12 when it reaches its first extreme position. Likewise, a stopping member 20, which is disposed on the opposite side of the shank 12 and is preferably attached to a stationary casing member 21 (attachment not shown), abuts the shank 12 when it reaches the second, extreme material fracturing position. A pin 22 pivotally joins the shank 12 to the casing member 21 which also supports the housing 14 to constrain the reciprocation of the shank 12 along an arcuate path about a pivot axis 24.

The shank 12 includes a sealing portion 26, an impact receiving portion 28, and a fracturing tip 29. As better illustrated in FIG. 2, the shank's sealing portion 26 has a cylindrical sealing surface 26a and a longitudinal axis 26b about which the cylindrical sealing surface 26a is disposed. The impact receiving portion 28 has a longitudinal axis 28b and an impact receiving surface 28a which is engageable at intermittent times with a rotatable eccentric impacting member 30. A shank guide structure 31 includes two shank guides 32 (the one nearer the viewer having been removed to provide better visibility of the impact receiving portion 28) which are fixedly attached to the housing interior 15 and together transversely define an opening within which the impact receiving portion 28 is receivable. The shank guides 32 are arranged in closely spaced, transverse relation with the impact receiving portion 28 so as to direct the impact receiving surface 28a into an optimum impact receiving relationship with the impact member 30 and to resist transversely directed forces exerted on the shank 12 by the impacting member 30 and by the fracturable material. The shank guides 32 have an axial length 32a which is greater than the distance separating the extreme reciprocation positions of the shank's impact receiving surface 28a as illustrated in FIG. 1. The mechanism for intermittently engaging the impacting member 30 with the impact receiving surface 28a is better described in U.S. Pat. No. 3,868,145 which issued Feb. 15, 1975, and is assigned to the present invention's assignee. The sealing surface's longitudinal axis 26b is perpendicular to a line 33 which extends radially from the pivot axis 24. As a result, the longitudinal axis 26b remains perpendicular to the radial line 33 for all positions assumable by the shank 12 along its arcuate reciprocation path. The sealing surface's longitudinal axis 26b is inclined relative to the impact receiving portion's longitudinal axis 28b by an angle of approximately 10° by example.

The annular elastomeric seal 16 (best illustrated in FIGS. 3A and 3B) has a relatively rigid inner terminating portion 36 and a relatively rigid outer terminating portion 38 which are respectively fixedly attached to the sealing surface 26a and the housing 14 so as to prevent debris intrusion into the housing's interior 15 and to prevent lubricant leakage out of the housing's interior 15. When the shank 12 assumes the position illustrated in FIG. 2 which is intermediate its extreme reciprocation positions, the seal apparatus 16 is unstrained symmetrically disposed about the longitudinal seal axis 16a and the sealing surface's longitudinal axis 26b coincides with the seal's longitudinal axis 16a. The seal 16 includes an annular flexible portion 40 which is disposed between and joined to the relatively rigid terminating portions 36 and 38. A plurality (in this case two) of concentrically arranged interconnected convolutions 42 and 44 together constitute the flexible seal portion 40. The convolutions 42 and 44 have a convoluted centersurface 16b which appears as a centerline in FIG. 3B. It is to be understood that the centersurface 16b is the locus of points traced by the centerline illustrated in FIG. 3 as it is rotated about the longitudinal axis 16a. It is to be further understood that the centersurface 16b is an imaginary surface which is introduced for reference purposes only.

The convolutions 42 and 44 respectively include an inner and an outer margin 46 and 48 which bound the flexible portion 40, interface with the inner and outer terminating portions 36 and 38 respectively, and have exemplary thicknesses perpendicular to the centersurface 16b of 4 mm and 3 mm, respectively. The inner margin 46 constitutes the effective inner edge of the flexible portion 40 and is disposed along the radial line 33. The inner convolution 42 has a smaller radius of curvature $R_1$ of 17.77 mm by example as measured from an axis of curvature $O_1$ to the centersurface 16b than does the outer convolution 44 whose radius of curvature $R_2$ of 23.69 mm by example is measured from an axis of curvature $O_2$ to the centersurface 16b. The axes of curvature $O_1$ and $O_2$ (illustrated in FIG. 3B) are separated, or offset, by a distance which is designated generally by the reference letter O and, by example, equals 16.0 mm.

It is to be understood that the previously mentioned sizes and dimensions for the seal 16 correspond to a seal which utilizes an elastomer material commonly known in the trade as Hytrel. A suitable alternative seal material constitutes fabric reinforced neoprene rubber which varies in exemplary thickness from 7 mm at the inner margin 46 to 5 mm at the outer margin 48. The offset O of the radii of curvature by example equals 10.0 mm while the radii of curvature for the inner and outer convolutions 42 and 44, respectively, constitute 16.78 mm and 22.37 mm for such fabric reinforced neoprene seal material.

The inner and outer margins 46 and 48 respectively interface with and are connected to the inner and outer terminating portions 36 and 38. The thickness of seal 16 perpendicular to the centersurface 16b varies from the inner margin 46 to its outer margin 48 with decreases from the inner margin's thickness being proportional to the radial distance H (illustrated in FIG. 3B) separating the centersurface 16b at the inner margin 46 from the centersurface 16b at the seal location in question. The seal's terminating portions 36 and 38 have thicker cross sections (as measured perpendicularly to the centersurface) than the flexible portion 40 since the terminating portions 36 and 38 are actually joined to the relatively reciprocatable shank 12 and housing 14. The flexible seal portion 40 has isolation faces 50 and 52 which are equidistant from the convoluted centersurface 16b and are respectively exposed to the environment surrounding the impact apparatus 10 and that existing in the housing's interior 15.

The seal 16 further includes an annular connection member 54 of U-shaped cross section which is disposed about and vulcanized bonded to the inner terminating portion 36. The U-shaped connection member 54 is open along the axial end adjacent the inner margin 46 and is closed on the opposite axial end. The connection member 54 has a radially inwardly facing surface 56 which is threadably engageable with the sealing surface 26a. A plurality (two in the illustrated case) of openings 57 in the connecting member 54 are provided to receive a tightening tool used to relatively rotate and threadably engage the seal 16 and the sealing surface 26a with a predetermined torque. A cylindrical locking extension 58 protrudes from the connection member 54 and is deformable into a plurality of restraining slots 59 (best illustrated in FIG. 2) formed in the shank 12 to prevent relative rotation of the connection member 54 and the sealing surface 26a in a threadably disengaging direction.

A retainer ring 60, illustrated in FIGS. 1, 2, and 4, is engageable with the seal's outer terminating portion 38 and is securable to the housing 14 by a plurality of threaded screw bolts 62. The retaining ring 60 is annular relative to the longitudinal seal axis 16a except in the vicinity of a vertical centerline therethrough where the retaining ring's radial thickness is reduced to permit disposition thereof between the seal's outer terminating portion 38 and the casing member 21. The retaining ring 60 and the outer terminating portion 38 are engageable along cooperatively ramped interfacing surfaces 38a and 60a which are respectively disposed thereon. Tightening the screw bolts 62 displaces the retaining ring 60 relative to the outer terminating portion 38, increases the interference therebetween as a result of the cooperative inclination of the ramped surfaces 38a and 60a, compresses the seal's outer terminating portion 38. Optimum sealing of the seal's outer terminating portion 38 with the housing 14 and the retaining ring 60 obtains when the retaining ring 60 engages the housing 14. A securing bead 38b of the terminating portion 38 extends radially inwardly and is receivable in a circular notch 14a formed in the housing 14.

An enlarged view of the impact receiving portion 28 is illustrated in FIG. 5 as viewed from a vantage point A as indicated in FIG. 1. The impact receiving portion 28 has an outer periphery 28c which constitutes a four-sided figure whose corners have been rounded. The longest protrusion of the outer periphery 28c from the impact receiving portion's longitudinal axis 28b is the radius 28d which is smaller than the radius separating the sealing surface 26a from the sealing longitudinal axis 26b. Such size differential enables axial displacement of the seal 16 over the impact receiving portion's outer periphery 28c.

Industrial Applicability

With the fracturing apparatus 10 assembled as previously described, highly effective sealing is provided between the arcuately reciprocatable shank 12 and the housing 14 by the seal 16 which is fixedly joined to both. When the impact receiving portion 28 of the shank is in its first extreme position (furthest intrusion into the housing's interior 15 between the shank guides 32), the sealing surface's longitudinal axis 26b is skewed relative to the seal's longitudinal axis 16a. A coincident relationship between the seal's longitudinal axis 16a and the sealing surface's longitudinal 26b axis obtains when the shank 12 occupies the position illustrated in FIG. 2. Arcuate reciprocation of the shank 12 in either direction from the position illustrated in FIG. 2 results in a pivoting of the sealing surface's longitudinal axis 26b relative to the seal's longitudinal axis 16a. Such relative pivoting of the longitudinal axes 16a and 26b necessarily occurs since the sealing surface 26a is constrained to pivot about the pivot axis 24 while the seal's longitudinal axis 16a remains fixed since it is defined by the configuration of seal 16 when it is unstrained. The seal's longitudinal axis 16a thus occupies a stationary position relative to the housing 14. The center of the shank's impact receiving surface 28a is displaceable between the extreme reciprocation positions illustrated in FIG. 1 through a distance of approximately 70 mm by example. When the shank 12 occupies the second or extreme material fracturing position, the maximum strain on the seal 16 is approximately 9.6% which is significantly lower than the strain levels encountered in previous seals used in similar material fracturing apparatus.

Canting the shank's sealing portion 26 relative to the shank's impact receiving portion 28, providing a concentric relationship between the seal 16 and the sealing portion 26 for one position of the shank 12, and arranging the seal's inner margin 46 along the radial line 33 as well as utilizing the seal geometry previously described results in greatly reduced strain levels in the seal 16 which are substantially equal at the points of maximum strain. Oscillation of the shank about the pivot axis 24 is necessary to provide the desired reciprocating motion thereto. At the seal's inner terminating portion 36, this oscillation produces an arcuate motion which may be resolved into two perpendicular components of displacement: an axial displacement component parallel to the longitudinal axis 16a of the unstrained seal 16 and a radial displacement component perpendicular to the unstrained seal axis 16a. Such radial displacement can be visualized by noting that the top (as viewed in FIG. 1) of the seal's terminating portion 36 will slightly approach the top of the seal's terminating portion 38 simultaneously with the bottom of the seal's terminating portion 36 moving away from the bottom of the seal's terminating portion 38. Seal strain produced by the combined axial and radial displacements is greater than that produced by the axial displacement alone, primarily because the radial displacement deforms the seal into an unsymmetrical configuration relative to the longitudinal axis 16a of the unstrained seal. It was found that the additional strain resulting from such radial deflection of the seal 16 could be minimized by: (1) canting the seal 16 and the sealing portion 26 to provide perpendicularly between the radial line 33 and the longitudinal axis 26b; and (2) arranging the seal's inner margin 46 (located where the seal 16 becomes rigid or is effectively attached to the shank 12) along the radial line 33. Cooperatively canting the longitudinal axes 26b and 16a to provide coincidence thereof when the shank configuration of FIG. 2 occurs reduces the strain in the seal 16 during arcuate reciprocation of the shank 12 while the seal's tapered wall thickness and convoluted shape equalizes the maximum strains induced therein. The geometrical features of seal 16 which are responsible for providing such substantially equalized maximum strains are the tapered thickness which is a function of the radial distance H, the convolutions' different radii of curvature $R_1$ and $R_2$, and the offset distance O between the axes of curvature.

The seal 16 may be removed from the material fracturing impact apparatus 10 by extracting the screw bolts 62, removing the retaining ring 60, disengaging the deformed areas of the locking extension 58 from the locking slots 59, and rotating the seal 16 and integral connection member 54 to threadably disengage them from the sealing surface 26a. After moving the stopping member 20 to an unobstructing position, the shank 12 is arcuately displaced to a convenient position where the impact receiving portion 28 is disengaged from the shank guides 32 and is resident outside the housing's interior 15. The seal 16 is then axially displaced along the outer periphery 28c of the impact receiving member 28 until it passes the impact receiving surface 28a and can be removed to a remote location. Assembly of the seal 16 is accomplished in the opposite order as just described: the stopping member 20 is moved to an unobstructing position; the shank 12 is arcuately displaced to a position where the impact receiving portion 28 is exterior to the housing 14; the seal 16 is slidingly displaced over the impact receiving portion's outer periphery 28c; the seal 16 and integral connection member 54 are rotated relative to the threaded sealing surface 26a until they are threadably engaged to a suitable tightness; areas of the locking extension 58 which are aligned with the restraining slots 59 are deformed thereinto; the terminating portion 38 of seal 16 is engaged with the housing 14 such that the restraining bead 38b is inserted in the notch 14a to secure the seal 16 in place and facilitate assembly of the retaining ring 60; the retaining ring 60 is disposed on the opposite side of the seal's terminating portion 38 from the housing 14; and the screw bolts 62 are inserted through the retaining ring 60 and torqued into the housing 14 to provide the desired sealing between the seal's terminating portion 38 and the housing 14.

During shank reciprocation, the cross section of the flexible seal portion 40 flexes between an "S-shape" and a nearly straight line as illustrated in FIG. 1. The respective orientation of the convolutions 42 and 44 toward and away from the housing 14 cause fracturable material and other debris exposed to the isolation face 50 to be expelled therefrom during seal flexure and thus avoid potentially debilitating, seal immobilizing debris accumulation on the isolation face 50. The U-shaped cross section of the connection member 54 shields the vulcanized bond from direct impingement by fracturable material during shank reciprocation and maximizes the bonding area between the seal material (preferably Hytrel) and the connection member 54 (preferably carbon steel) for the purpose of reducing the stress (and thus increasing the life) imposed thereon during shank reciprocation.

While the seal 16 has been illustrated as providing sealing between an arcuately reciprocatable shank 12 and a stationary housing 14, it is to be understood that the seal 16 may be used with equal facility with the purely translatably reciprocatable intermediate hammer member described in U.S. Pat. No. 3,922,017 which issued Nov. 25, 1975.

It will now be apparent that a material fracturing impact apparatus 10 and associated seal apparatus 16 have been provided in which the following obtain: excellent sealing, exceptionally long seal life, and high reliability. Such attributes are necessary for practical operation of the impact apparatus 10 and seal apparatus 16 in the hostile environments to which they are customarily subjected.

We claim:

1. A seal apparatus (16) for sealing between a first (12) and a second (14) relatively displaceable member, said seal apparatus (16) comprising:
an annular, rigid inner terminating portion (36), an annular, rigid outer terminating portion (38), an annular flexible portion (40) having an inner margin (46), an outer margin (48), a longitudinal axis (16a), and a plurality of concentrically arranged, interconnected convolutions (42,44), the thickness of said convolutions (42,44) perpendicular to a convoluted centersurface (16b) therethrough decreases from said inner margin (46) to said outer margin (48) in proportion to a radial separation distance (H) between the centersurface (16b) at said inner margin (46) and the centersurface (16b) along said convolutions (42,44), said inner (36) and outer (38) terminating portions being respectively joined to said inner (46) and outer (48) margins and being respectively fixedly attachable to the first (12) and the second (14) members so as to move therewith.

2. The seal apparatus (16) of claim 1 wherein said terminating portions (36,38) have a greater thickness than does said flexible portion (40).

3. The seal apparatus (16) of claim 2 further comprising:
a connection member (54) disposed about and bonded to said first terminating portion (36), said connection member (54) having a radially inwardly facing surface (56) which is threadably engageable with the first displaceable member (12).

4. The seal apparatus (16) of claim 3 further comprising:
means (58) for resisting thread disengagement rotation about said longitudinal axis (26b) between said connection member (54) and the first displaceable member (12).

5. The seal apparatus (16) of claim 4, said rotation resisting means (58) comprising:
a locking projection (58) having a first end joined to said connection member (54) and a second end extending from said connection member (54), said second end being deformable into slots (59) formed in the first displaceable member (12).

6. The seal apparatus (16) of claim 1 wherein said inner convolution (42) has a radius of curvature ($R_1$) and said outer convolution (44) has a greater radius of curvature ($R_2$).

7. The seal apparatus (16) of claim 6 wherein said smaller radius of curvature ($R_1$) extends from a first axis of curvature ($O_1$) and said greater radius of curvature ($R_2$) extends from a second axis of curvature ($O_2$), said axes of curvature ($O_1, O_2$) being axially offset a predetermined distance (O).

8. The seal apparatus (16) of claim 1 wherein said outer terminating portion (38) has a ramped surface (38a) which is arranged at a predetermined angle to said longitudinal axis (16a) and a securing bead (38b) which protrudes radially inwardly to facilitate assembly thereof with the second (14) member.

* * * * *